United States Patent [19]
Weidlich et al.

[11] Patent Number: 5,916,487
[45] Date of Patent: Jun. 29, 1999

[54] PROCESS FOR OBTAINING A PHOTOCHROMIC COMPOUND AND PRODUCTS OBTAINED

[75] Inventors: Jürgen Weidlich, Wolfen; Udo Dieckmann, Dessau; Otto Volker, Wolfen, all of Germany

[73] Assignee: Saint Gobain Vitrage, Courbevoie, France

[21] Appl. No.: 08/887,705

[22] Filed: Jul. 3, 1997

[30] Foreign Application Priority Data

Jul. 3, 1996 [DE] Germany .................. 196 26 691

[51] Int. Cl.⁶ ..................................... G02B 5/23
[52] U.S. Cl. ................ 252/586; 252/584; 430/266; 430/568
[58] Field of Search ................... 252/586, 584; 430/266, 568

[56] References Cited

U.S. PATENT DOCUMENTS

| | | | |
|---|---|---|---|
| 3,672,901 | 6/1972 | Ohkubo et al. | 96/94 |
| 3,708,304 | 1/1973 | Hiller | 96/114.1 |
| 3,957,490 | 5/1976 | Libber et al. | 96/94 |
| 4,049,567 | 9/1977 | Chu et al. | 252/300 |
| 4,332,889 | 6/1982 | Siga et al. | 430/583 |
| 5,015,416 | 5/1991 | Reid | 252/586 |
| 5,073,303 | 12/1991 | Reid | 252/584 |
| 5,256,337 | 10/1993 | Reid et al. | 252/584 |

FOREIGN PATENT DOCUMENTS

WO 91/16644  10/1991  WIPO.

*Primary Examiner*—Philip Tucker
*Attorney, Agent, or Firm*—Pennie & Edmonds LLP

[57] ABSTRACT

The invention relates to a process for obtaining a photochromic compound based on a transparent polymer matrix, in which:

a) a silver sol is prepared comprising at least one essentially transparent polymer matrix and particles of silver of a mean size smaller than 500 nm, b) an emulsion is produced by mixing the said silver sol with an oxidizing agent in the presence of at least one halogen and/or pseudohalogen.

The invention also relates to the compound obtained and, lastly, a transparent substrate coated with at least one layer consisting essentially of such a compound.

14 Claims, No Drawings

PROCESS FOR OBTAINING A PHOTOCHROMIC COMPOUND AND PRODUCTS OBTAINED

BACKGROUND OF THE INVENTION

The invention relates to a process for obtaining a photochromic compound and also to a photochromic compound obtained according to this process.

It applies more particularly to the manufacture of photochromic glazing employed either in building or in vehicles.

Processes of this type are described, for example, in documents DE 2 707 602 A1 and WO 91/16644. In these known processes a photochromic emulsion of silver halide is produced by reacting dissolved silver salts with silver halides, this being done in the presence of polymer binders. The polymer binders must be chosen so that they bind the halides reversibly. In addition, it is also known to dope silver halide crystals by means of copper ions, this being not only within the bulk but also on the surface. In addition, it is known that the photochromic effect of the emulsion can be improved by adding other metal salts, for example cobalt, chromium, manganese, magnesium or rare-earth salts.

Whereas in the case of the known photochromic glasses, in which the solver halides are dispersed in the glass matrix, each silver halide centre is visibly independent of the others insofar as its photochromic properties are concerned, it seems that this is not the case with polymer matrices. The known photochromic compounds based on a polymer matrix tend in any event no longer react in a completely reversible manner in the course of time and to form dispersion centres, with the result that the layers exhibit an increasing level of light scatter. To improve the behaviour of such compounds it is proposed in documents DE 2 707 602 A1 and WO 91/16644 to give the polymer matrix a determined minimum of electrical conductivity by adding to the emulsion, for example, acids, ammonium salts or glycerine.

SUMMARY OF THE INVENTION

The objective of the invention is then to circumvent the above mentioned disadvantages and to proposed a process for obtaining a photochromic compound based on a transparent polymer matrix which, intrinsically and in the long term, exhibits a minimum level of light scatter and reacts completely reversibly.

Another objective of the invention is also to propose a process for obtaining a photochromic compound which exhibits a contrast (that is to say a ratio of the light transmission in the transparent state to the light transmission in the coloured state) which is high for a low proportion of silver, and a high light transmission in the transparent state.

Finally, another objective is to proposed a process for obtaining a photochromic compound in which the above mentioned properties are preserved at elevated temperatures.

DETAILED DESCRIPTION OF THE INVENTION

These objectives are attained, according to the invention, owing to the fact that:

a) a silver sol is prepared comprising at least one essentially transparent polymer matrix and particles of silver of mean size smaller than 500 nm, especially between 20 and 250 nm, b) an emulsion is produced by mixing the said silver sol with an oxidizing agent in the presence of at least one halogen and/or pseudohalogen.

As halogen it is possible to introduce negatively charged species of halogens, that is to say of the elements of column 7a of the Periodic Table of the elements, such as chloride, bromide or iodide ions, alone or mixed. In addition, all the combinations are fundamentally possible. As pseudohalogen it is possible to employ preferably thiocyanate ions, optionally in combination with chloride or bromide ions.

"Pseudohalogen" is understood to mean organic or inorganic chemical species which tend to become negatively charged like halogens.

The silver sol is preferably mixed with the oxidizing agent in substantially stoichiometric proportions.

Using the process according to the invention a maximum contrast is successfully obtained during the action of the luminous radiation. Only clusters of silver and the oxidized form of the metal salt are found as reaction products during the action of the luminous radiation on the silver halide crystals. Clusters are understood to mean silver aggregates and agglomerates. No free halogen is formed in this way, with the result that it is not necessary to cover the silver halide crystals with a halogen-impervious layer, which is the case in the state of the art. In addition, in the process according to the invention it is not necessary to employ a binder which binds the halogens merely reversibly.

In a preferred embodiment of the invention, conditions are chosen during the reaction of the silver sol with the oxidizing agent which are such that the silver halide being formed have a minimum size, to reach a maximum contrast and a very low level of light scatter. The reaction conditions, like temperature, rate of agitation, rate of addition and the like are preferably chosen such that the silver halide particles being formed do not exceed a mean size of approximately 300 nm.

The redox potential of the oxidizing agent is preferably adjusted such that in the absence of light radiation the position of the equilibrium is situated completely on the side of the silver ions and of the reduced form of the oxidizing agent and that during the maximum activity of the light radiation it is transferred completely on the silver and oxidizing agent side.

The preparation of the appropriate silver sol can be carried out in various ways. Thus it is possible, for example, to prepare a silver sol by direct-current sputtering of a silver wire in pure water, the size of the particles depending on the voltage applied. However, it is also possible to prepare appropriate silver salts by high-frequency continuous discharges, as well as by electrolysis of a $10^{-4}$N NaOH solution in the presence of gum arabic, between two silver electrodes. Furthermore, it is also possible to convert a suspension of $Ag_2O$ in water into silver sol by heating. Other possibilities of preparation of silver sols consist in the reduction of soluble silver salts with an appropriate reducing agent, like gaseous hydrogen, hydrazine compounds, phosphine, hypophosphoric acid, sodium dithionite, sodium sulphite, hydroquinone, formaldehyde and other aldehydes, formamidinesulphinic acid, ascorbic acid, iron citrates and tartrates and alkaline solutions of dextrin, starch and/or gelatin.

In the course of all these processes for the preparation of silver sols there may be present, in order to stabilize them, protective colloids of polymer type like gelatin, polyvinylpyrrolidone, poly(vinyl alcohol), gum arabic, starch, agar and the like. Thus prepared, the silver sols may, if necessary, be freed from excess anions and cations by treatment with ion exchangers. When the sols contain a gelling binder, this can also be done by treatment with cold liquid water.

Furthermore, there is the possibility of flocculating the sol and of separating off the excess solution by centrifuging or settling and, next, of preparing the silver sol anew by suspending the silver deposit in the desired solution. In this way it is possible not only to adjust the silver concentration in the sol independently of the process of preparation, but also, if necessary, to introduce another binder or mixture of polymer binders.

The removal of the excess ions and reaction products can be done, in a particularly effective manner, by ultrafiltration. A desired separation of specific products can moreover be carried out by means of a filter with an appropriate molecular weight cutoff. At the same time, as in the case of the flocculation and sedimentation processes, the possibility of adjusting the desired silver concentration without destroying the sol formed in the first stage also exists here.

Heavy metal ions which can exist in various oxidation states are employed as oxidizing agent for the silver sol, such that the highest oxidation state oxidizes the silver in the absence of an electromagnetic radiation of appropriate wavelength. The lower oxidation state of the heavy metal ions which is thus obtained reduces, by the action of the luminous radiation, the silver ions anew to silver and is converted, again, to the upper oxidation state. The appropriate heavy metals are, for example, iron, cobalt, manganese, chromium, vanadium, titanium, copper, cerium, terbium, europium and ytterbium.

In order that the correct redox potential should be reached between the two oxidation states of the heavy metal ions in the reversible photochromic process, the heavy metal ions may be bound in a complex. The appropriate complexants include halides such as fluorides, chlorides, bromides, or iodides psuedohalides, cyanides, cyanates, thiocyanates, selenocyanates, acetic acid derivatives like aminoacetic acid, nitriloacetic acid, nitrilotriacetic acid, ethylenediamine tetraacetic acid, citric acid, salicylic acid, phenanthroline, porphyrin, and phthalocyanine or, also, oxo groups.

When, in the case of the redox process, the redox potential depends on the hydrogen concentration, the pH of the photochromic compound can also be adjusted within the necessary limits.

The polymer matrix may consist, for example, of a poly(vinyl alcohol), poly(acrylic acid), poly(meth-acrylic acid) or mixtures of such polymers. Other substances may be added to the layers at various stages of the preparation to reach defined physicochemical properties, for example silanes whose hydrolysis forms crosslinked $SiO_2$ structures which then modify the properties of the polymer binder.

If necessary, appropriate anionic, cationic or nonionic wetting agents may be added, to obtain non-scattering compounds and/or to improve the moistening of other substances.

To guarantee the movement of the ionic parts of the photochromic reaction, a minimum ion mobility is necessary in the photochromic compound. This is obtained by maintaining a certain quantity of residual moisture in the compound by means of specific additives. Such additives are, for example, glycerine, polyethylene glycol and inorganic acids like phosphoric and sulphuric acids, in particular their alkyl-substituted derivatives with alkyl chain lengths of 1 to 5 carbon atoms.

The photochromic compounds thus obtained are advantageously deposited in the form of a layer on a transparent, especially rigid, substrate of the glass or plastic type.

Such a substrate of a geometric thickness which is generally between 2 and 6 mm is noteworthy in that it exhibits a high contrast of at least 5, especially of 10 to 25 and preferably of between 10 and 13, in the case of a silver deposit density of the order of 0.5 to 1 $g/m^2$, preferably equal to 0.7 $g/m^2$.

This substrate can be employed as it is as monolithic glazing or else associated with other glazings to constitute either a laminated or multiple glazing.

Such photochromic glazings find a wide application in the building or motor vehicle industry.

Some examples of photochromic compounds obtained according to the process according to the invention are described in what follows.

EXAMPLE 1

The following procedure is followed to prepare an appropriate silver sol: the following solutions are prepared:
Solution 1
  100 g of dextrin made up to 400 ml with distilled water;
Solution 2
  6000 ml of distilled water;
Solution 3
  150 g of NaOH made up to 700 ml with distilled water;
Solution 4
  100 g of $AgNO_3$ made up to 160 ml with distilled water;
Solution 5
  30 g of $Na_2HPO_4$ made up to 200 ml with distilled water;
Solution 6
  3 ml of 25% $NH_3$ made up to 1070 ml with distilled water;
Solution 7
  100 g of poly(vinyl alcohol), 50 ml of 3% sodium dioctyl sulphosuccinate made up to 700 ml with distilled water;
Solution 8
  4.4 g of 98% $H_2SO_4$ made up to 70 ml with distilled water.

All solids are dissolved with good stirring. Solution 1 is added to solution 2 at 40° C. over 2 minutes with stirring (propeller stirrer, 200 rev/minute). After a period of 10 minutes, solution 3 is added to this solution at a stirring rate of 350 rev/minute and at a rate of addition of 75 ml/mixture and next, at the same stirring rate, solution 4 is at 10 ml/minute. The reaction mixture is cooled to 25° C. and solution 5 is added. Stirring is continued for another 15 minutes at 150 rev/minute. The product is centrifuged in a jacketed centrifuge at 1000 rev/minute, the supernatant solution is removed and the remaining centrifuged product is introduced into solution 6 at a stirring rate of 250 rev/minute. After a stirring period of 20 minutes, solution 7 is added at 100 rev/minute over 15 minutes. Stirring is continued for another 3 minutes and then solution 8 is added over 4 minutes. The reaction product is stirred for 30 minutes. In this way a black silver sol is obtained with a silver content of 0.294 mol/liter (92% yield of silver). The silver particles have a mean diameter of 250 nm (determined by electron microscopy).

The following solutions are produced for preparing the solution containing the oxidizing agent:
Solution 1
  60 g of gelatin
  280 ml of distilled water;
Solution 2
  25 ml 5M $H_2So_4$;
Solution 3
  40 ml 1M $FeSO_4SO_4$-$7H_2O$
Solution 4
  80 ml 0.2M NaCl; p0 Solution 5
  30 ml 0.2M KSCN;

Solution 6

120 ml 0.2M $KMnO_4$;

The gelatin is swollen for 2 hours in cold water (+5° C.). Next, it is heated to 50° C. with good stirring (propeller stirrer, 250 rev/minute), and, after the temperature has been reached, stirring is continued for another 30 minutes. Solution 2 is added at this temperature at 1 ml/minute and stirring is continued for 60 minutes at 300 rev/minute. The solution is cooled to 25° C. and solutions 3 to 6 are added, in the given order, at 10 ml/minute. An interval of 10 minutes is made between each addition. At the end of the additions the mixture is heated to 40° C. and stirred for another 60 minutes.

To obtain the photochromic compound from the silver sol and the solution of oxidizing agent, 14 ml of the solution of oxidizing agent are added to 8.5 ml of well stirred distilled water at 35° C. and over 10 minutes. After another 5 minutes' stirring, 7.5 ml of the silver sol are added at a rate of addition of 1 ml/minute. The emulsion formed is next stirred again for 300 minutes. The photochromic compound produced is then deposited onto a glass sheet of geometric thickness of between 2 and 6 mm, where it is solidified and dried. The density of the silver deposit is 0.7 $g/m^2$.

The light transmission is measured in the case of the glass sheet thus coated, before and after exposure to light, and so is the behaviour under scattered light. The measurement of transmission is made as measurement A according to DIN Standard 4512, Part 9, for a pathlength X of 310, at three specified, b (blue), g (green) and r (red), wavelengths. The exposure of the sample is made by daylight distribution in the 700-watt Suntest CPS. The measurements are performed before exposure of the sample to light, after an exposure for a period of 20 minutes and after a period of 20 minutes following the exposure, at ambient temperature in each case.

The behaviour in diffuse light is determined before exposure with a hazemeter (haze-grad plus) according to ASTM Standards D 1003 and 1044, at ambient temperature in each case.

The measurements produced the following values:

| | Light scatter: 2.2% | | |
|---|---|---|---|
| Transmission $T_L$ (%) | b | g | r |
| before exposure | 83.4 | 84.0 | 84.2 |
| immediately after 20 minutes' exposure | 7.8 | 6.3 | 14.8 |
| 20 minutes after exposure | 47.9 | 51.3 | 59.9 |

The measurements are repeated after 2000 darkening-lightening cycles. The values measured are essentially unchanged.

EXAMPLE 2

A silver sol is prepared from the following solutions:
Solution 1
    150 g of dextrin made up to 500 ml with distilled water;
Solution 2
    80 g of NaOH made up to 500 ml with distilled water;
Solution 3
    45 g of gelatin made up to 500 ml with distilled water;
Solution 4
    100 g of $AgNO_3$ made up to 1500 ml with distilled water;
Solution 5
    96 ml of 50% acetic acid.

Solution 2 is added to solution 1 at 35 ml/minute at 45° C. with good stirring with a propeller stirrer at 250 rev/minute. After addition, stirring is continued for another 10 minutes. Solution 3 is then added at the same rate over 1 minute and stirring is continued for 30 minutes. The temperature is then lowered to 35° C. and solution 4 is added with intensive stirring (350 rev/minute) at 15 ml/minute. After the addition the stirring is continued 20 minutes and solution 5 is added over 2 minutes. After another period of stirring of 60 minutes at a rate of 200 rev/minute the product is purified from excess sols and from reaction products by ultrafiltration by means of a filter with a minimum molecular weight cutoff of 100 000. The silver concentration is kept constant in the sol and the filtrate is continuously replaced with distilled water until the conductivity of the silver sol reaches the value of 1000 mS (measured at 40° C.). A yellow silver sol is obtained. With a 90% yield the silver content is 0.171 mol/liter. The mean diameter of the silver particles is determined by electron microscopy: it is 20 nm.

The solution described in Example 1 is again employed as solution of oxidizing agent.

To obtain the photochromic compound from the silver sol and the solution of oxidizing agent 14 ml of the solution of oxidizing agent are added to 3.0 ml of well-stirred distilled water at 35° C. and over 10 minutes. After another 5 minutes' stirring 13.1 ml of the silver salt are added at a rate of addition of 1 ml/minute. The subsequent treatment of the solution and the preparation of the photochromic compound are done as described in Example 1.

The tests carried out on the samples also correspond to the tests described in Example 1. They produce the following measurement results:

| | Light scatter: 1.43% | | |
|---|---|---|---|
| Transmission $T_L$ (%) | b | g | r |
| before exposure | 87.4 | 87.6 | 87.5 |
| immediately after 20 minutes' exposure | 7.2 | 8.7 | 15.2 |
| 20 minutes after exposure | 74.1 | 77.3 | 79.5 |

Repetition of the measurements after 2000 darkening-lightening cycles produces essentially no change in the measured results.

EXAMPLE 3

A silver sol is prepared from the following solutions:
Solution 1
    150 g of polyvinylpyrrolidone K 25
    36 ml of 3% sodium dioctylsulphosuccinate made up to 700 ml with distilled water;
Solution 2
    10 g of gelatin made up to 100 ml with distilled water;
Solution 3
    100 g of $AgNO_3$ made up to 300 ml with distilled water;
Solution 4
    8 g of $Na_2So_3$ and 4.7 g of hydroquinone, made up to 50 ml with distilled water.

Solution 2 is added to solution 1 at a rate of 20 ml/minute at 40° C. with good stirring with a propeller stirrer at 200 rev/minute and, after a stirring period of 10 minutes, 80% of solution 3 is added over 1 minute. The temperature is lowered to 30° C. and after a stirring period of 30 minutes at a rate of 300 rev/minute, solution 4 is added at a rate of 5 ml/minute. To finish the reaction, stirring is continued for another 120 minutes. An orangy-red silver sol is obtained. The silver yield is 99%. The mean diameter of the silver particles is determined by electron microscopy: it is 32 nm.

The following solutions are produced for preparing the oxidizing agent:

Solution 1
   30 g of gelatin
   126 ml of distilled water;
Solution 2
   6 ml 2M $H_3PO_4$;
Solution 3
   120 ml 0.1M $CuCl_2$;
Solution 4
   60 ml 0.5M HCl.

The gelatin is swollen for 2 hours in cold water (+5° C.). Next, it is heated to 65° C. with a rate of heating of 1°ml/minute and is stirred for 45 minutes at this temperature (propeller stirrer, 250 rev/minute). Solution 2 is then added at 0.1 ml/minute and, after the addition, stirring is continued for 120 minutes. Next the mixture is cooled to 40° C. over 25 minutes and solution 3 is added at 5 ml/minute and, after a 10-minute interval, solution 4 at 0.6 ml/minute. To finish, the oxidizing agent is stirred for another 150 minutes.

To obtain the photochromic compound from the silver sol and from the solution of oxidizing agent, 17.1 ml of the solution of oxidizing agent are added to 12.1 ml of well stirred distilled water at 35° C. and over 10 minutes. After another 5 minutes' stirring 0.9 ml of the silver sol is added at a rate of addition of 1 ml/minute. The subsequent treatment of the solution and the preparation of the photochromic compound are done in the same way as that described in Example 1.

The same measurements as those described in Example 1 are carried out on the samples thus prepared. The measurements produce the following results:

| Light scatter: 1.42% | | | |
| --- | --- | --- | --- |
| Transmission $T_L$ (%) | b | g | r |
| before exposure | 88.0 | 89.4 | 89.6 |
| immediately after 20 minutes' exposure | 3.6 | 4.3 | 17.0 |
| 20 minutes after exposure | 72.4 | 72.1 | 74.1 |

Repetition of the measurements after 2000 darkening-lightening cycles produces essentially no change in the measured values.

We claim:

1. Process for obtaining a photochromic compound based on an essentially transparent polymer matrix, comprising:
   a) preparing a silver sol comprising at least one essentially transparent polymer matrix and particles of silver of mean size smaller than 500 nm, and
   b) producing a photochromic emulsion by mixing the said silver sol with an oxidizing agent in the presence of at least one halogen and/or pseudohalogen.

2. Process according to claim 1, wherein the silver sol is prepared by reduction of soluble silver salts with reducing agents chosen from hydrogen, hydrazine compounds, phosphine, hypophosphoric acid, sodium dithionite, sodium sulphite, hydroquinone, formaldehyde, formamidinesulphinic acid, ascorbic acid, iron citrate, iron tartrate and alkaline solutions of dextrin, starch and/or gelatin.

3. Process according to claim 2, wherein the excess reaction products are separated from the silver prepared sol.

4. Process according to claim 3, wherein excess anions and cations are separated from pure aqueous salt by treatment with an ion exchanger.

5. Process according to claim 3, wherein the sol is flocculated, with excess solution separated off by centrifuging or settling and, next, the silver sol is prepared anew by suspending the silver deposit.

6. Process according to claim 3, wherein a separation of excess ions and reaction products is carried out by ultrafiltration.

7. Process according to claim 1, wherein, when the silver sol is prepared, a protective colloid of polymer type such as gelatin, polyvinylpyrrolidone, poly(vinyl alcohol), gum arabic, starch or agar is added so as to stabilize the prepared silver sol.

8. Process according to claim 1, wherein the silver sol is mixed with the oxidizing agent in substantially stoichiometric proportions.

9. Process according to claim 1, wherein ions of heavy metals which form different oxidation states, such as the iron, cobalt, manganese, chromium, vanadium, titanium, copper, cerium, terbium, europium and ytterbium ions are employed as oxidizing agent.

10. Process according to claim 9, wherein ions of heavy metals which form complexes are employed by application of appropriate redox potentials.

11. Process according to claim 10, wherein complexed heavy metal ions are employed in which a halide, a pseudohalide, aminoacetic acid, nitriloacetic acid, ethylenediaminetetraacetic acid, citric acid, salicylic acid, phenanthroline, porphyrin, phthalocyanine or oxo groups are used as complexant.

12. Process according to claim 1, wherein a redox potential of the photochromic emulsion is determined by the hydrogen ion concentration.

13. Process according to claim 1, wherein the polymer matrix is chosen from gelatin, poly(vinyl alcohol), polyvinylpyrrolidone, poly(acrylic acid), poly(methacrylic acid), polyalkylamine, cellulose acetate, agar, gum arabic and mixtures thereof.

14. The process of claim 1, wherein the particles of silver are of mean size between 20 and 250 nm.

* * * * *

UNITED STATES PATENT AND TRADEMARK OFFICE
CERTIFICATE OF CORRECTION

PATENT NO. : 5,916,487

DATED : June 29, 1999

INVENTOR(S) : Jürgen Weidlich et al.

It is certified that error appears in the above-identified patent and that said Letters Patent is hereby corrected as shown below:

On the title page at [75] Inventors: change "Dessau" to --Genthin--; change "Otto Volker" to --Volker Otto--; and change "Wolfen" to --Thalheim--.

Signed and Sealed this

Eighteenth Day of January, 2000

Attest:

Q. TODD DICKINSON

*Attesting Officer*  *Commissioner of Patents and Trademarks*